May 7, 1963 K. J. DAVIS 3,088,251

GEAR FINISHING TOOL

Filed Oct. 24, 1958

INVENTOR.
KENNETH J. DAVIS
BY
Whittemore Hulbert
& Belknap ATTORNEYS.

United States Patent Office 3,088,251
Patented May 7, 1963

3,088,251
GEAR FINISHING TOOL
Kenneth John Davis, Detroit, Mich., assignor to National Broach & Machine Company, Detroit, Mich., a corporation of Michigan
Filed Oct. 24, 1958, Ser. No. 769,440
4 Claims. (Cl. 51—168)

The present invention relates to a gear finishing tool.

It is an object of the present invention to provide a gear finishing tool comprising an inner support body of circular cross-section, an outer annular toothed body, and yieldable means interconnecting said bodies.

More specifically, it is an object of the present invention to provide a gear finishing tool comprising a rigid support body of circular cross-section, an annular toothed body having teeth thereon capable of removing material from gear teeth when operated in mesh therewith, and yieldable means interposed between said bodies and effective to support said annular body on said support body for limited radial and circumferential displacement thereon.

It is a further object of the present invention to provide a gear finishing tool as described in the foregoing paragraphs in which the toothed portion is formed of a hard but slightly yieldable and highly resilient resin compound having abrasive grains embedded therein and exposed at the surface thereof.

It is a further object of the present invention to provide structure as described in the preceding paragraphs comprising additional means for varying the compression of said yieldable means to thereby vary its effective resistance to both radial and circumferential displacement of said toothed annular body.

It is a further object of the present invention to provide a tool as described in the foregoing paragraphs including guide means extending between said support body and said annular body effective to prevent relative axial displacement therebetween.

Other objects and features of the invention will become apparent as the description proceeds, especially when taken in conjunction with the accompanying drawings, illustrating preferred embodiments of the invention, wherein.

Figure 1:
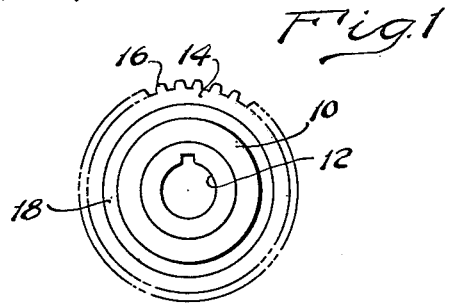
FIGURE 1 is an elevational view of a tool constructed in accordance with the present invention.

Referring first to FIGURE 1 there is shown a tool comprising an inner support body 10 of circular cross-section, the support body preferably having a centrally located hole 12 by means of which it may be mounted on a tool arbor. Located concentrically with the support body 10 and spaced radially outwardly therefrom is an annular toothed body 14, the peripheral portions of which are provided with teeth 16 which may be conjugate to the teeth of a gear to be finished. The annular toothed body 14 is separated radially from the outer peripheral portion of the support body 10 and this space is filled with an annular coupling ring 18 formed of a yieldable material such for example as a natural or synthetic rubber, or a suitable yieldable plastic. The ring 18 is highly resilient and supports the toothed annular body 14 on the support body 10. Due to its yieldability however, both radial and circumferential displacement of the annular toothed body 14 relative to the support body 10 is permitted.

While the present invention may be used in conjunction with gear shaving or gear lapping, its maximum utility is obtained when the annular toothed body 14 is formed of an abrasive material providing a gear hone. A material which has proven exceptionally efficient in producing gear hones is a resin compound formed of equal parts by weight of epoxy resin and a relatively fine abrasive material such for example as powdered silicon carbide. The epoxy resin is the result of a reaction between epichlorohydrin and Bisphenol-A carried out in the presence of a water solution of sodium hydroxide at a temperature of approximately 100 degrees Fahrenheit. The reaction is continued to produce an epoxy resin having an approximate molecular weight of 400. The epoxy resin is liquid. The epoxy valve, equiv./100 gm. is 0.50. The hydroxyl groups per molecule are 0.14–0.28.

This resin compound, in order to produce the gear honing tools having the toothed peripheral portion shown, is mixed with abrasive material and hardener in approximately the following proportions by weight:

| | |
|---|---|
| Resin compound | 100 |
| Abrasive grain (46–280 grit) | 100–150 |
| Hardener (aliphatic or polyamine such as metaphenylene diamine) | 15–20 |

This material may be readily cast to the solid form and is characterized in part by its dimensional stability which permits casting to the final required dimensions.

Figure 2:
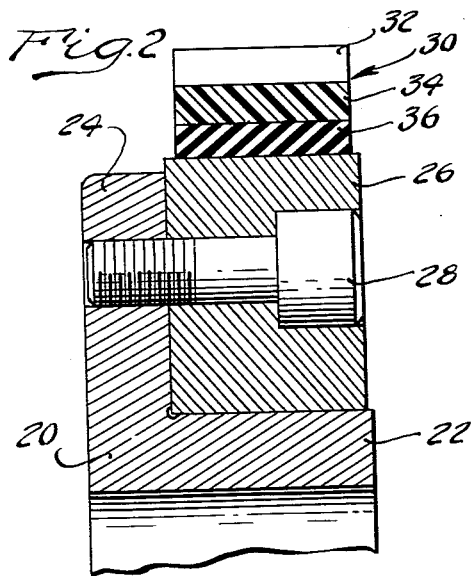
FIGURE 2 is a fragmentary enlarged sectional view of the details of such a tool.

Referring now to FIGURE 2 there is shown a support body 20 having a hub 22 and radially extending flange 24. An intermediate annular support body 26 is illustrated herein as fastened to the support body 20 by screws 28. The annular toother gear finishing or honing portion of the tool is illustrated at 30 and includes gear-like teeth 32 and a continuous annular body portion 34. Intermediate the annular body 34 and the support body 26 is a yieldable support ring 36 which may be formed of natural rubber, synthetic rubber, or a suitable plastic material. The parts may be assembled in the relationship shown in FIGURE 2 by maintaining the rubber under substantial compression while the annular body 34 is assembled to surround it and thereafter releasing the rubber.

It will of course be appreciated that the yieldable support ring 36 in the embodiment of the invention shown in FIGURE 2 permits limited radial circurferential and axial displacement between the bodies 26 and 34. The amount of resistance which the support ring opposes to displacement of the annular body 34 on the support body 26 may be controlled as desired. A primary control is in the compounding of the material of the support ring 36. The radial dimension or thickness of the ring is of course also effective to influence its supporting action. Finally, the degree of initial compression of the annular support ring enters into its effectiveness as a support.

In gear finishing, and particularly in gear honing, it is desirable to maintain a pressure contact between the working surfaces of the teeth of the tool and the teeth of the gear. However, it is also desirable to permit a limited yielding so that excessive stresses will not be transmitted to the teeth of the tool. In the case of honing such stresses may cause the hone to break down rapidly or it may even cause the teeth of the hone to break out of the tool. By employing a yieldable support ring such as the ring 36, the average operating pressure between the teeth of the tool and gear may be controlled while at the same time some yielding of the tool relative to the work gear is permitted. This yielding results in additional compression of the rubber or other yieldable material and hence results in an increase in pressure whenever a displacement of the toothed portion of the tool takes place.

This is an important feature of the present invention. Consider for example the situation which may exist when the gear and tool are brought into mesh with initial contact at the low side of an eccentric work gear. During rotation, as the high side of the gear meshes with the teeth of the tool, the tool is displaced away from the gear, thus preventing injury or breakage of the tool. However, this displacement of the tool results in an increased pressure proportional to the amount of displacement so that the metal removing action of the tool is thus in turn proportional to the displacement. Since this displacement is the result of an error which is to be corrected, the tool automatically provides its greatest corrective action at the portions of the work gear exhibiting the greatest error, or in other words, the portions of the work gear which require the greatest finishing action.

Figure 3:
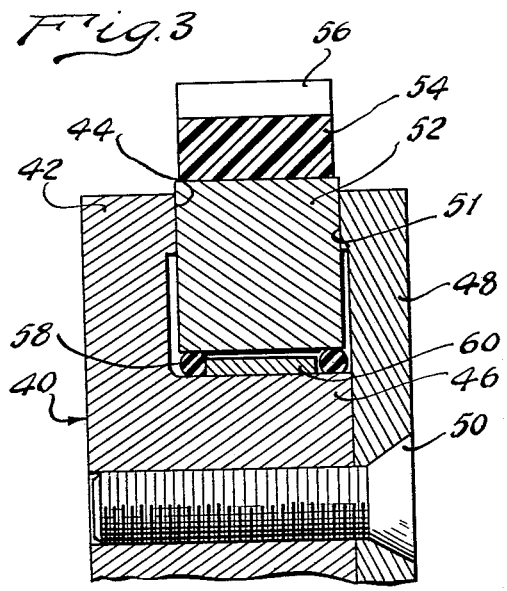
FIGURE 3 is a view similar to FIGURE 2 illustrating a second embodiment of the present invention.

Referring now to FIGURE 3 there is illustrated a second embodiment of the present invention in which there is provided a support body 40 having a radially extending flange portion 42 provided at its outer edge with an axially extending projection 44. The support body includes a hub 46 to which is secured a guide ring 48, the connection being illustrated as retained by screws 50. At its outer edge at the side thereof facing the flange 42 the guide ring 48 is provided with an axially extending projection 51. Mounted between the flange 42 and the guide ring 48 is a support ring or core 52 which may be of metal or plastic and which is surrounded by the toothed annular body 54 having the gear finishing tooth 56 formed thereon. The body 54 may be formed of the resin compound previously described in detail. The support ring 52 is mounted on the hub 46, and interposed between the hub 46 and the support ring 52 are a plurality of yieldable O-rings 58 herein shown as two in number. Preferably, intermediate the O-rings there is provided an annular element 60 adapted to limit radial displacement of the support ring 52. The axially extending portions 44 and 51 of the flange 42 and guide ring 48 respectively operate as guide surfaces which permit substantially free radial and circumferential movement of the support ring 52 while effectively preventing any displacement thereof axially of the support structure including the body 40 and the guide ring 48.

Figure 4:
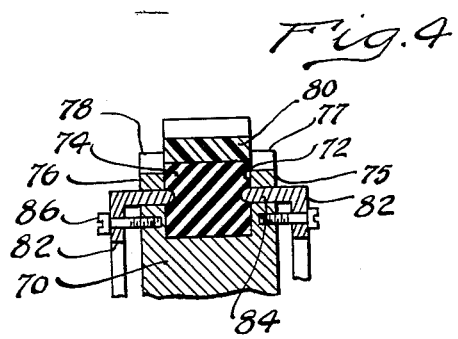
FIGURE 4 is a view similar to FIGURE 2 illustrating yet another embodiment of the present invention.
Figure 5:
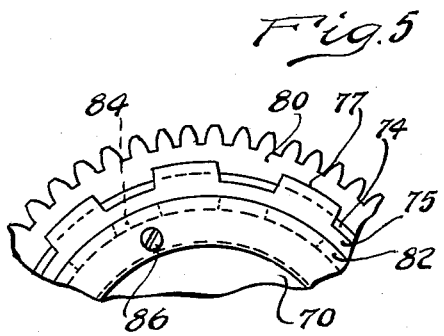
FIGURE 5 is a fragmentary end view with parts broken away of the structure shown in FIGURE 4.

Referring now to FIGURES 4 and 5 there is illustrated another embodiment of the present invention in which a support body 70 is provided with an annular peripheral recess 72 adapted to receive a yieldable and resilient coupling ring 74. The recess 72 is defined between the side flanges 75 and 76 of the support body. The flanges 75 and 76 include a plurality of separated guiding extensions 77 and 78 respectively. The annular toothed body 80 which may be formed of the abrasive containing resin compound previously described, is herein illustrated as having its inner portion received between the extensions 77 and 78 but terminating outwardly from the tops of the continuous portions 75 and 76. The extensions 77 and 78 constitute guides permitting limited radial and circumferential displacement of the annular toothed body 80 while preventing displacement thereof axially of the support body 70.

It will be observed in these figures that the yieldable material is substantially but not completely trapped in a chamber formed on three sides by the recess 72 and at its outer side by the annular toothed body 80. Means are provided for varying the effectiveness of the yieldable support ring 74 and this means comprises rings 82 each of which has a plurality of circumferentially separated fingers 84 slidable through slots in the flanges 75 and 76. The rings 82 and fingers 84 are adjustable by means of screws 86 extending through the rings 82 into the support body 70. It will be apparent that inward movement of the rings 82 causes the fingers 84 carried thereby to displace material of the yieldable support ring 74 and thereby to increase its resistance to radial and circumferential displacement of the annular toothed portion 80. A yieldable rubber, which may be employed as the material of the ring 74, is not essentially compressible and it is for this reason that the flanges 75 and 76 are provided with the extensions 77 and 78 respectively. These extensions are circumferentially separated as previously described, and thereby provide openings into which the yieldable material of the support ring 74 may be displaced by inward movement of the fingers 84.

The material of the yieldable ring interposed between the central core and the relatively rigid annular toothed portion has been described as a yieldable resilient material. The resin compound used in the production of the annular toothed peripheral portion of the tool has also been described as slightly yieldable and highly resilient. From the foregoing it will of course be apparent that the nature of these two materials is essentially dissimilar. The material of the peripheral toothed portion of the tool is quite hard and maintains a form except when displaced under relatively high unit pressure. When this occurs the resilience of the material causes it to regain its initial form as soon as the high unit pressure has been removed.

On the other hand, the annular coupling ring which connects the central core and the annular toothed peripheral portion is relatively soft and is intended to yield so as to limit the total force acting between the gear and the gear-like tool to a few pounds, as for example between one and fifty pounds. Similarly, when the gear and gear-like tool is in loose mesh, the annular coupling ring limits the total circumferential force acting between the gear and tool to a correspondingly small range. Thus, the function of the yieldable coupling ring is to establish and maintain a relatively small average force acting between the gear and tool. This force is of course variable in accordance with displacement as previously described.

It is desired to emphasize the fact that the total force acting between the gear and tool is quite a different matter from the unit pressure between the toothed surfaces of the gear and tool. It will be appreciated that when a high spot of limited area is present on a tooth of the gear, it may exert an extremely high unit pressure on corresponding portions of the mating teeth of the tool as it moves in mesh therethrough. This however, will in most cases not substantially influence the total radial or circumferential force acting between the tool and gear as a whole.

By way of a specific example, a yieldable coupling ring of approximately one inch thickness and having a radial dimension of approximately ½ inch may be formed of a good grade of rubber, either natural or synthetic, having a Shore durometer of 40–80.

The drawings and the foregoing specification constitute a description of the improved gear finishing tool in such full, clear, concise and exact terms as to enable any person skilled in the art to practice the invention, the scope of which is indicated by the appended claims.

What I claim as my invention is:

1. A honing tool comprising a support body which includes a hub portion of a predetermined outside diameter and a radial flange at one end of said hub portion having a predetermined outside diameter which is larger than the outside diameter of said hub portion, an annular plate connected to the other end of said hub portion and having an outside diameter substantially equal to the outside diameter of said flange, said plate defining with said flange and said hub portion an annular retaining recess having an inside diameter equal to the diameter of said hub portion and an outside diameter equal to the diameter of said flange and said plate, a pair of axially spaced yieldable resilient O-rings of circular cross-section in said recess around said hub portion, each O-ring having an outside diameter substantially smaller than the outside diameter of said annular recess so as to occupy a relatively small portion of said recess, an annular toothed honing body having a portion positioned in said recess to occupy the majority of the remaining portion of said recess, the inside surface of said honing body being in surface to surface contact with said O-rings, said honing body having teeth at least the surface portions of which are of hard resilient plastic material having abrasive particles embedded therein, said O-rings providing for both radial and circumferential yielding of said toothed honing body relative to said support body, the inner surfaces of said flange and said plate being provided with axially extending oppositely facing annular guide abutments which bear against opposite sides of said honing body for preventing relative axial movement between said honing body and said flange and said plate.

2. The honing tool defined in claim 2 wherein an annular element having a thickness which is less than the diameter of the cross-sectional area of an O-ring is sleeved on the outside surface of said hub portion in the space between said O-rings for limiting the radial displacement of said honing body towards the longitudinal axis of the support body.

3. A honing tool comprising a support body which includes a hub portion of a predetermined outside diameter and a pair of radially extending flanges at opposite ends of said hub portion, said flanges having outside diameters which are larger than the outside diameter of said hub portion, said flanges defining with said hub portion an annular retaining recess having an inside diameter equal to the diameter of said hub portion, annular resilient means in said recess around said hub portion, said annular resilient means having an outside diameter substantially smaller than the outside diameter of said annular recess so as to occupy a relatively small radially inner portion of said recess, an annular toothed honing body having its radially inner portion positioned in said recess to occupy the remaining radially outer portion of said recess, the inside surface of said honing body being in surface to surface contact with said annular resilient means, said honing body having teeth at least the surface portions of which are of hard resilient plastic material having abrasive particles embedded therein, said annular resilient means providing for radial yielding of said toothed honing body relative to said support body, the inner surfaces of said flanges being provided with oppositely facing annular guide abutments which bear against opposite sides of said honing body for preventing relative axial movement between said honing body and said flanges, said annular resilient means comprising a pair of axially spaced yieldable resilient O-rings.

4. The honing tool defined in claim 3 wherein an annular element having a thickness which is less than the height of the cross-sectional area of an O-ring measured radially of said support body is sleeved on the outside surface of said hub portion in the space between said O-rings for limiting the radial displacement of said honing body towards the longitudinal axis of the support body.

References Cited in the file of this patent

UNITED STATES PATENTS

| | | |
|---|---|---|
| 158,617 | Bannister et al. | Jan. 12, 1875 |
| 162,010 | Bannister | Apr. 13, 1875 |
| 254,011 | Hofstad | Feb. 21, 1882 |
| 792,050 | King | June 13, 1905 |
| 1,386,988 | Burlew | Aug. 9, 1921 |
| 1,924,736 | Fehr | Aug. 29, 1933 |
| 1,989,650 | Drummond | Jan. 29, 1935 |
| 2,004,630 | Krug | June 11, 1935 |
| 2,115,209 | Mulholland et al. | Apr. 26, 1938 |
| 2,187,350 | Kuzmick | Jan. 16, 1940 |
| 2,351,842 | Seibold | June 20, 1944 |
| 2,436,466 | Wilson | Feb. 24, 1948 |
| 2,913,858 | Praeg et al. | Nov. 24, 1959 |

FOREIGN PATENTS

| | | |
|---|---|---|
| 504,055 | Germany | Aug. 1, 1930 |